United States Patent [19]

Oestreich et al.

[11] 4,414,165

[45] Nov. 8, 1983

[54] METHOD AND DEVICE FOR PRODUCING AN OPTICAL TRANSMISSION ELEMENT

[75] Inventors: Ulrich Oestreich; Gernot Schoeber, both of Munich; Gerd Witt, Neuried, all of Fed. Rep. of Germany

[73] Assignee: Siemens Aktiengesellschaft, Berlin & Munich, Fed. Rep. of Germany

[21] Appl. No.: 357,699

[22] Filed: Mar. 12, 1982

[30] Foreign Application Priority Data

Mar. 26, 1981 [DE] Fed. Rep. of Germany ....... 3111693

[51] Int. Cl.³ .............................................. B29D 11/00
[52] U.S. Cl. ..................................... 264/1.5; 264/173; 264/174; 350/96.23; 425/71; 425/113
[58] Field of Search ....................... 264/1.5, 173, 174; 350/96.23; 425/71, 113

[56] References Cited

U.S. PATENT DOCUMENTS 4,302,073 11/1981 Bendayan ......................... 350/96.23
4,330,173 5/1982 Oestreich ......................... 350/96.23

FOREIGN PATENT DOCUMENTS 2513722 9/1976 Fed. Rep. of Germany .
2621508 11/1976 Fed. Rep. of Germany ....... 264/1.5
53-7340 1/1978 Japan ................................ 350/96.23
1487464 9/1977 United Kingdom ............. 350/96.23
1545270 5/1979 United Kingdom ............. 350/96.23
2017335 10/1979 United Kingdom ............. 350/96.23

OTHER PUBLICATIONS

Proceeding of the 27th International Wire & Cable Symposium, Cherry Hill, NJ., Nov. 11–14, 78, Fiber Optic Cable, Design and Installation Experiences, Bark et al., pp. 379–384.

*Primary Examiner*—James B. Lowe
*Attorney, Agent, or Firm*—Hill, Van Santen, Steadman & Simpson

[57] ABSTRACT

A method and apparatus for forming an optical transmission element having a fiber shaped optical waveguide loosely received in a tubular jacket containing a filling material characterized by introducing a fiber into a jacket as it is being extruded at an elevated temperature, cooling the jacket and fiber to a second temperature below said elevated temperature and above the ambient temperature, coiling the cooled jacket into a coil arrangement and while coiling controlling the rate of introduction of the fiber into the jacket so that the fiber lies on the inner diameter of each radius of curvature of the coil with the amount of retardation of the introduction and the amount of the second temperature above room temperature being arranged so that upon cooling to room temperature, the fiber has the desired length relationship to the length of the jacket.

22 Claims, 1 Drawing Figure

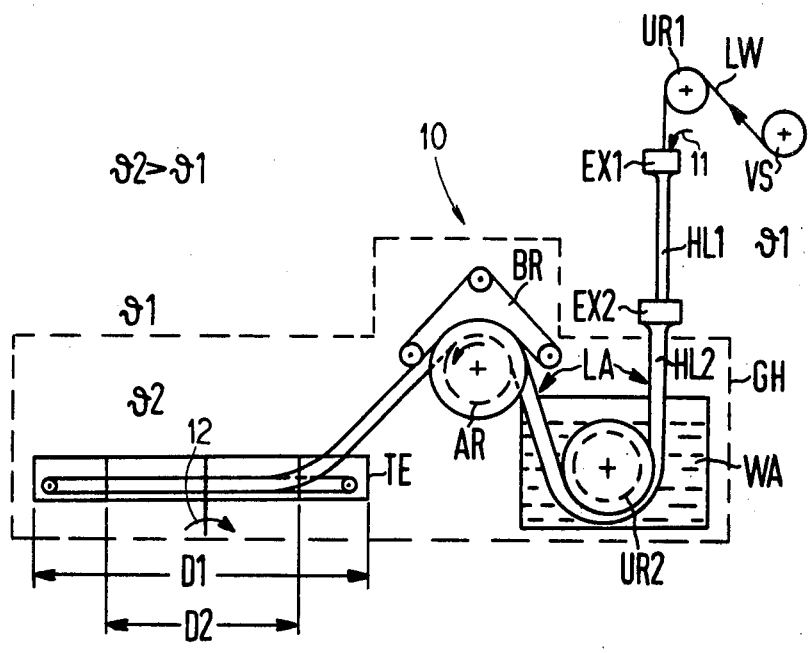

METHOD AND DEVICE FOR PRODUCING AN OPTICAL TRANSMISSION ELEMENT

BACKGROUND OF THE INVENTION

The present invention is directed to a method and apparatus for the manufacture of optical transmission elements or optical waveguide conductors which have a fiber-shaped optical waveguide loosely received in a tubular jacket containing a filling material and having a diameter greater than the waveguide so that the waveguide is freely movable in the jacket to a certain extent.

An optical cable, which has a fiber-shaped optical waveguide loosely received in the interior of a tubular sleeve is disclosed in German A.S. 25 13 722. The tubular sleeve or jacket itself consists of two concentric layers, which are manufactured from different plastic materials and which accordingly exhibit different mechanical properties.

In the manufacture and processing of optical transmission elements or cables of this type, a series of difficulties occur which consist of the fact that a precise conformity of the mean length of the tubular jacket to the optical waveguide fiber must be guaranteed, or, however, that the optical waveguide fiber must have an excess length of a definite amount. Furthermore, cautions must be exercised so that during the introduction of a filling compound, the compound does not disturb the tubular jacket and the above mentioned relationship between the length of the fiber and the tubular jacket. Moreover, a subsequent length variation following the manufacturing process, which variation may occur either with an elastic post-shrinkage or due to an excessively large coefficient of thermal expansion, must be avoided.

SUMMARY OF THE INVENTION

The present invention is directed to a method and apparatus which enables manufacturing an optical waveguide conductor or optical transmission line having a fiber light optical waveguide loosely disposed in a tubular jacket or sleeve which has a greater internal diameter than the fiber and contains a filling material so that the waveguide is freely mobile in the jacket to a certain extent and which enables obtaining the desired relationships in the lengths of the jacket to the fiber.

To accomplish these goals, the method comprises providing a fiber shaped optical waveguide and means for forming the jacket at an elevated temperature, forming a vertically extending jacket by said means, simultaneously introducing the filling material and waveguide into the vertically extending jacket as it is being formed, cooling the formed jacket to a lower second temperature, coiling the jacket into a coil arrangement during a portion of said step of cooling, said step of coiling including maintaining the waveguide on the smallest radius of curvature of the coiled tubular jacket by retarding the rate of introduction of the waveguide into the jacket as it is being formed and subsequently cooling the coiled arrangement from the second temperature to the ambient temperature with the shrinkage of the jacket which occurs during said second cooling step and amount of retarding of the waveguide producing the desired relative length between the jacket and the waveguide.

The forming of a vertically extending jacket by the means for forming the jacket, which is preferably an extruding device, guarantees that the jacket is minimally deformed or disturbed from its regular configuration due to he simultaneously introduction of the filling material and fiber to the interior thereof. Due to the fact that the optical waveguide is retarded by a braking force as it is being introduced into the jacket being formed, it will be initially placed on the smallest radius of curvature within the loose fitting jacket as the element is being coiled so that the variations occurring in the case of shrinkage or length alteration as a consequence of cooling can be calculated. Since the cooling is conducted in the framework from a defined second temperature to ambient room temperature it is also possible to obtain a precisely defined amount of shrinkage of the jacket and thus a precise determination of the relative length of the tubular jacket to the optical waveguide. The combination of the step of retarding the rate of introduction of the optical waveguide on the one hand and to precisely determine the amount of shrinkage by controlling the amount of cooling from the second temperature to ambient temperature will produce a fabrication process which can be conducted with a high degree of precision and always supply products of a uniform quality.

The preferred structure of an apparatus or device for practicing the method comprises means for forming a tubular jacket at an elevated temperature and extending in a vertical direction, and means for introducing the waveguide into the tubular jacket as it is being formed, said means for introducing including a supply wheel for the waveguide and means for retarding the rate of introduction of the waveguide into the tubular jacket. The device also includes a housing means for enclosing the tubular jacket after it is formed, said housing means being at a second temperature above the ambient temperature and containing a trough of cooling medium or fluid for rapidly cooling the tubular jacket to the second temperature. The housing also has means for coiling the jacket in a flat coil arrangement.

Preferably, the means for forming the tubular jacket comprises one or more extruding devices for extruding the tubular sleeve or jacket. If the jacket is to be composes of two concentric layers, the device comprises a first extruder for extruding the inner layer or sleeve and a second extruder for extruding the second layer or outer layer on the first layer. In such an arrangement, the means for introducing the filling material and the optical waveguide, such as an optical fiber, are arranged to introduce these into the inner sleeve as it is being extruded by the first extruding arrangement.

BRIEF DESCRIPTION OF THE DRAWING

The FIGURE schematically illustrates an apparatus in accordance with the present invention which performs the method of the present invention.

DESCRIPTION OF THE PREFERRED EMBODIMENTS

The principles of the present invention are particularly useful in a device or apparatus generally indicated at 10 which enables forming an optical transmission element or optical waveguide conductor LA, which comprises an optical fiber-like waveguide or optical fiber LW loosely received in a tubular jacket with filling material. The device 10 has a frame, which is not illustrated but supports a supply wheel VS and a deflection roller UR1. The optical waveguide LW, which has been wound on the supply reel VS, is withdrawn therefrom in the direction of the arrow to pass over the deflection roller UR1 and to move vertically downward therefrom. Friction between the supply reel VS and its support as well as braking forces which may be supplied to the reel VS and to the roller UR1 form means for breaking the movement of the waveguide LW to enable retarding the rate of advance or introduction thereof. In the device 10, means for forming a tubular jacket is positioned directly beneath the deflection roller UR1. The means for forming a tubular jacket is illustrated as a first extruder EX1 which will extrude an inner jacket or sleeve HL1 at an elevated temperature and to extend downward in the vertical direction. The first extruder EX1 is a conventional extruder for extruding tubular jackets or sleeves of synthetic materials.

The extrude EX1 has a nozzle, which extrudes the sleeve which initially converges towards the desired diameter of the sleeve. Due to a pulling of the extruded sleeve, the sleeve as it leaves the nozzle of the extruder EX1 has a conically stretching or shaping zone. The nozzle of the first extruder has a central bore which communicates with the interior of the stretching zone of the jacket and the waveguide is passed through this bore for introduction into the jacket.

A filling compound of material is also introduced into the interior of the sleeve as schematically illustrated by arrow 11 at the time the fiber forming the waveguide LW is introduced. This filling material can be introduced by either being supplied through an injection needle which will project through the central bore of the extruder EX1 into the stretching zone of the initially extruded sleeve or it can be applied by passing the optical fiber through a vessel or cell with an exit nozzle of the desired dimensions to allow coating of the fiber which will then pull the filling material into the sleeve. In addition, a combination of both methods or approaches can be utilized. Since the filling compound expediently is applied in a cold state, it will cool the tubular sleeve or jacket from the inside and thus aids in restricting the length of the stretching zone to a constant and low value. Such a restriction provides a good diameter consistency for the tube or jacket.

In the illustrated embodiment of the device 10, an inner or first jacket HL1 is extruded from the extruder EX1 and is extruded of material which is a tough, dimensionally and constructionally stable, relaxing materials. For example, the inner jacket HL1 can be formed from suitable fluoropolymers or polyamides and in the conventional temperature range the material will have a coefficient of thermal expansion of approximately 0.5 to 0.7 times $10^{-5}/K$. The means for forming the tube as illustrated includes means for forming a second outer jacket HL2 which will serve the purpose of reinforcing the first jacket HL1 and will consist of either the same materials or materials with specifically different properties. For example, the other jacket HL2 can be of a material with a particularly high modulus of elasticity and be both heat and flame resistance. This material can be made from polyesters, polyamides or high melting fluoropolymers. In the device 10, the internal jacket HL1 is first produced and rapidly cools off. Then the second outer jacket HL2, which is adhering as possible, is extruded directly onto the first partial jacket HL1 by a second extruder EX2. Since the second jacket is extruded at the elevated extrusion temperature, it may have a tempering effect on the first formed jacket HL1. In spite of the high fabrications speed and because of the cooling created by the insertion of the filling compound, the total jacket formed of the inner layer HL1 and the outer layer HL2 will have a small post shrinkage which should lie or be at $<1.10^{-3}$.

The dimensions of the first formed inner jacket HL1 are so selected that after the cooling off, a sufficiently large inside diameter is present. As illustrated, the second extruder EX2 is arranged in alignment with the output of the first extruder EX1 and will extrude the second partial layer HL2 onto the first inner jacket HL1 as it passes through a central opening in the second extruder. It is noted that as the first jacket HL1 enters the second extruder, it has not entirely cooled from the molten pliable state but is sufficiently solidified.

Directly below the output of the second extruder EX2, the device 10 includes housing means GH, which receive the multilayer tube and begins to cool it from the elevated extrusion temperature to a second temperature which is above room temperature. In the housing means GH, a specific temperature $\theta_2$ is maintained and is higher than room temperature which is the ambient temperature $\theta_1$ outside of the housing means GH. The temperature $\theta_2$ lies above the external room temperature $\theta_1$ by such an amount that the product of the coefficient of thermal expansion for the jacket and the temperature difference produces the desired length alteration of the jacket relative to the waveguide LW.

A tempered cooling bath is positioned in the housing means GH immediately following a short distance from the second extruder EX2 and consists of a trough WA containing a cooling medium and a deflection roller UR2. Through the cooling medium or fluid in the trough WA, a relatively rapid cooling off of the jackets HL1 and HL2 is obtained so that after the jackets HL1 and HL2 have entered the medium in the trough WA in a vertical direction, they can be passed around the deflection wheel or roller UR2 and brought into another direction for leaving the trough WA. The diameter of the deflection wheel roller UR2 is selected in a range of between 100 and 1000 times diameter of the transmission element LA. The optical transmission element LA leaves the trough WA after passing around the deflection roller UR2 and goes to a removal or pulling arrangement comprising a wheel AR which is positioned above the trough WA and has a diameter similar to the diameter of the deflection roller UR2. The pulling arrangement of the wheel AR is preferably provided with a pressure belt however, it can also be designed in the form of a band drawing off arrangement BR that cooperates with the wheel AR to pull the element LA from the trough WA.

The element LA after passing around the removal wheel AR will move obliquely downward and be freely placed on a rotating plate TE. The optical transmission element LA can thus be deposited in an angular flat coil arrangement which will have a diameter in a range of between the greatest diameter D1 and a smaller diameter D2. In order to have a uniform rate of winding for the optical transmission element as it is being deposited in the annular take-up portion which is defined by the diameters D1 and D2. The rotational speed of the plate TE is altered by rotating means generally indicated by the arrow 12. The rate of rotation is varied in saw-tooth shaped fashion between a maximum value which is used when the element is being coiled on the smaller diameter D2 and a minimum value when the waveguide is being coiled on the maximum diameter D1. Thus, the annular linear rate of coiling will be substantially the same during the entire coiling operation.

During the step of coiling the transmission element LA on the plate TE, the optical waveguide such as the fiber LW is maintained adjacent the inner radius of the tubular jacket due to braking forces applied to the waveguide as it is being introduced through the extruder EX1. This braking force is guaranteed by virtue by of the fact that an optical waveguide or fiber is introduced into the vertically moving manufacturing process with a specific braking force. This braking force can be generated as pointed out hereinabove in a simple fashion of the region through the frictional forces on the supply reel VS and the deflection roller UR1 as well as by applying a braking means to either one of these elements.

By selecting the ambient temperature $\theta 2$, which is different from the room temperature $\theta 1$, the cooling off and shrinking process after removal of the plate TE which includes the coiled arrangement from the housing GH is respectively the same for all manufacturing operations regardless of the specific size of the transmission element. This selection of the temperature $\theta 2$ will also guarantee that through the corresponding subsequent cooling off from the second temperature $\theta 2$ to the ambient room temperature, the shrinking process will produce the desired relationship between the length of the optical waveguide LW and the tubular jacket.

It is noted that deflection into another direction in the region of the deflection roller UR2 occurs only after the jacket has virtually reached a temperature $\theta$ which is close to the temperature $\theta 2$. For example, the temperature $\theta$ of the jacket as it passes around the deflection roller UR2 has the following relationship $100° C. > \theta > \theta 2$ and this relationship in the case of the material is utilized in forming the tubular jacket signifies virtual termination of the solidification of the material. Thus, any sagging, which has been unavoidable in the case of horizontal cladding process of the initially still soft jacket is eliminated and also every otherwise possible adherence between the interior wall of the jacket and the optical waveguide will be avoided.

The ratio of the diameters D1 to D2 should lie as close as possible to one. For example, the value of D1 is expediently selected relatively large and D2 only approximately 20% smaller. Preferably, D1 can lie in a range of 1 to 2 meters and is preferably limited further to a range of 1.3 to 1.6 meters. When the diameter D1 has an order of magnitude of approximately 145 cm, the internal diameter for the coil arrangement D2 will be as small as approximately 115 cm. Thus, the means winding up diameter will lie at 130 cm (±15 cm).

Depending on the diameters of the internal inner jacket HL1, the optical waveguide fiber will thus become $0.46 \pm 0.05 \times 10^{-3}$ shorter than the jacket at its axis. Since the device BR cooperates with the roller AR to engage the exterior surfaces of the transmissio element LA, the only forces acting on the waveguide LW in the element LA, as the element is coiled on the plate TE, is the static friction between the interior surface of the jacket and the fiber forming the waveguide.

Since the wind up plate or coiling plate TE is positioned in the environment of the housing means GH, the transmission element LA after passing through the main cooling element such as the trough WA will remain at the second temperature which is above the ambient room temperature. When the plate TE with the coiled arrangement of the transmission element LA is removed from the housing means GH, the cooling of the coiled transmission element will cause a shortening of the jacket of the element to the length of the waveguide therein or less than the waveguide length depending upon whether the length of the jacket and waveguide at the second temperature was selected to obtain the minimum length jacket relative to the fiber or have the fiber exceed the minimum length relative to the length of the jacket.

The following numerical example will serve as an explanation. $\alpha \text{jacket} = 7 \times 10^{-5}/K$; $\Delta \theta = 10K$; and therefore $\Delta l/l = 7 \times 10^{-4}$; the minimum length on the heating plate $= 4.6 \times 10^{-4}$ and the excess length of the fiber is $(7-4.6) \times 10^{-4} = 2.4 \times 10^{-4}$.

The possible adjusted excess length of the fiber in relation to the tubular jacket is again removed during stranding which defines the braking force of the jacket on he transmission element. The loose position of the transmission element on the plate TE during the coiling operation here prevents the occurrence of an inertia forces in the jacket of the transmission element.

The cooling compound to be introduced into the tubular jacket is expediently designed to be of a paste type. This paste will exhibit properties in a temperature range of use for the cable which includes neither a freezing point nor a melting point and can be adapted to the intended use of the cable. The filling compound or material also will act as lubricating means and allow the fiber to slide or move within the jacket.

The braking force, which is applied to the fiber forming the waveguide LW as it is introduced into the tubular sheath during the formation thereof should amount to a range of between 0.2 N and 2 N. Preferably, the housing means GH has a second temperature $\theta 2$ maintained in a range of 5° to 30° C. higher than room temperature which is $\theta 1$ which is approximately 20° C.

Although various minor modifications may be suggested by those versed in the art, it should be understood that we wish to embody within the scope of the patent granted hereon, all such modifications as reasonably and properly come within the scope of our contribution to the art.

We claim:

1. A method for manufacturing an optical transmission element comprising a fiber-shaped optical waveguide loosely received in a tubular jacket of a greater internal diameter and containing a filling material so that the waveguide is freely moveable in the jacket to a certain extent, said method comprising providing the waveguide and means for forming a jacket at an elevated temperature, forming a vertically extending jacket by said means, simultaneously introducing the filling material and waveguide into the vertically extending jacket as it is being formed, cooling the formed jacket to a lower second temperature, coiling the jacket into a coil arrangement during a portion of said step of cooling, said step of coiling including maintaining the waveguide on the smallest radius of curvature of the coiled tubular jacket by retarding the rate of introduction of the waveguide into the jacket at said means for forming said jacket, and subsequently cooling the coiled arrangement from the second temperature to the ambient temperature with the shrinkage of the jacket occurring during said second cooling step and the amount of retarding of the waveguide producing the desired relationship between the length of the jacket and the length of the waveguide therein.

2. A method according to claim 1, wherein the step of coiling the formed jacket and waveguide comprises depositing the jacket containing the waveguide in a horizontal position.

3. A method according to claim 1, wherein the step of coiling includes providing a plate with a horizontal surface and the depositing the transmission element on said plate.

4. A method according to claim 3, wherein the step of coiling includes rotating the plate around its center axis, depositing the optical transmission element on said plate within a specific diameter range and changing the rate of rotation of said plate in response to the diameter of coiling so that the linear rate of coiling remains substantially constant.

5. A method according to claim 1, wherein the means for forming the tubular jacket comprises at least one extruder and said step of forming a vertically extending jacket comprises extruding the tubular jacket downward from the extruder in a vertical direction.

6. A method according to claim 5, wherein the means includes a second extruder positioned relative to the first extruder for extruding a second tubular jacket on the first formed jacket and said step of forming includes extruding a second jacket on the first formed jacket so that the tubular jacket of the transmission element comprises two concentric layer shrunken together.

7. A method according to claim 6, wherein the material extruded onto the first formed jacket exhibits at least one different property from the properties of the first formed jacket that is selected from a group consisting of physical and chemical properties.

8. A method according to claim 6, wherein the step of introducing a filling material comprises inserting a paste-like filling material into the tubular jacket as it is formed in the first mentioned extruder.

9. A method according to claim 1, wherein the step of retarding the rate of introduction of the optical waveguide comprises applying a braking force to the waveguide as it is being transported towards the means for forming the jacket.

10. A method according to claim 9, wherein the waveguide is provided on a supply reel and guided by at least one deflection roller to the point of introduction into the jacket, and wherein the applying of the braking force is created by braking torques applied to the supply reel and deflection roller.

11. A method according to claim 9, wherein the braking force amounts is in a range of between 0.2 and 2 N.

12. A method according to claim 1, wherein the step of cooling the formed jacket to a lower second temperature comprises providing housing means for receiving the jacket after its formation, said housing being maintained at said second temperature and containing means for cooling the jacket to said second temperature, said means for coiling being positioned in said housing so that the jacket is coiled into a coiled arrangement while at said second temperature.

13. A method according to claim 12, wherein the second temperature is above ambient room temperature by an amount in a range of 5 to 30 degrees C.

14. A method according to claim 1, wherein the means forming the tubular jacket comprises at least one extruder, said step of forming the jacket comprising the extruding of the jacket and said step of cooling the formed jacket including providing a trough containing a cooling liquid for receiving the jacket after it leaves said extruder.

15. A method according to claim 14, wherein the jacket with the waveguide enters the trough while moving downward in a vertical direction, said step of cooling including means for reversing the direction of movement of the jacket while in the cooling medium including a deflection roller.

16. A method according to claim 15, which includes means for drawing the jacket and waveguide from the trough after passing over the deflection roller, said means for pulling coiling the transmission element into a coiled arrangement.

17. A method according to claim 1, wherein the step of introducing the filling material into the jacket introduces a filling material in a cooled state to initially cool the jacket from the elevated temperature.

18. A device for producing an optical transmission element having a fiber shaped optical waveguide loosely received in a tubular jacket containing a filling material and having an interior diameter greater than the diameter of the waveguide so that the waveguide can freely move within the jacket to a limited extent, said device comprising means for forming a tubular jacket at an elevated temperature and extending in a vertical direction, means for introducing a waveguide into the tubular jacket as it is being formed, said means for introducing including a supply reel for the waveguide and means for retarding the rate of introduction of the waveguide into the tubular jacket; housing means for enclosing the tubular jacket after it is formed, said housing means being at a second temperature lower than the elevated temperature and above the ambient temperature, said housing means containing a trough of cooling medium for rapidly cooling the tubular jacket to said second temperature; and means for coiling the jacket into a coiled arrangement being disposed in said housing means.

19. A device according to claim 18, which further includes means for removing the jacket and waveguide after entering the trough of cooling medium.

20. A device according to claim 18, wherein said means for coiling includes a rotating plate having a substantially horizontal surface, means for withdrawing the tubular jacket and waveguide from said trough of cooling medium and depositing it on the horizontal surface of the rotating plate to form a substantially flat coil.

21. A device according to claim 18, wherein the means for forming a tubular jacket comprises at least one extruder for extruding the jacket of a synthetic material at an elevated temperature, said means for introducing the waveguide passing it through a central bore in the extruder to the interior of the tube being extruded therefrom, said device including means for injecting a filling compound into the interior of the newly extruded tube comprising an injection needle passing through the central bore for depositing the material in the interior of the newly extruded tube.

22. In a device according to claim 21, wherein the means for forming a tubular jacket includes a second extruder disposed immediately beneath the first extruder for extruding a second sleeve on the first formed sleeve so that the tubular jacket is a jacket of concentric layers.

* * * * *